June 29, 1926.
J. B. SMITH
1,590,212
DEVICE FOR REMOVING PNEUMATIC TIRES FROM THEIR RIMS
Filed Sept. 2, 1921
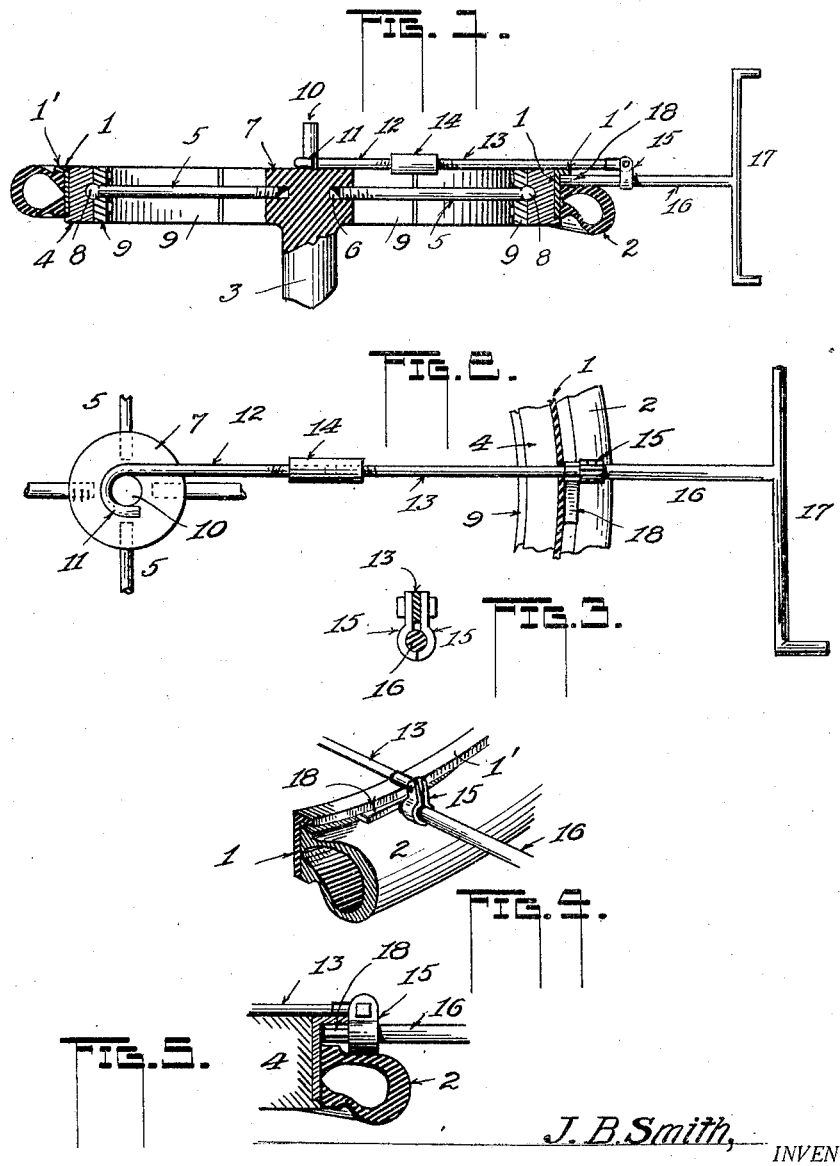
J. B. Smith, INVENTOR.
BY
L. M. Thurlow
ATTORNEY.

Patented June 29, 1926.

1,590,212

UNITED STATES PATENT OFFICE.

JOSEPH B. SMITH, OF HAVANA, ILLINOIS, ASSIGNOR TO WEAVER MANUFACTURING COMPANY, OF SPRINGFIELD, ILLINOIS, A CORPORATION OF ILLINOIS.

DEVICE FOR REMOVING PNEUMATIC TIRES FROM THEIR RIMS.

Application filed September 2, 1921. Serial No. 497,877.

This invention relates to a device for removing pneumatic tires from their rims.

The main object of the invention is that of providing a simple yet effective tool by which tires which quite often become "frozen" to the wheel-rim may be very easily removed without loss of time usually necessary with the ordinary hand tools, or the labor incident to older methods.

Another object is the provision of a structure of such a form as to cause the tire engaging portion thereof, in use, to follow around the rim from a central point in contact with the tire so that the latter may be quickly forced from said rim.

Besides the above objects the invention relates to certain details of construction to be pointed out herein and form the subject of certain of the claims.

In the appended drawing, forming part hereof,

Figure 1 is a sectional elevation of my invention showing a wheel-rim and tire in connection therewith.

Figure 2 is a fragmentary plan of the same produced on a larger scale.

Figure 3 is a transverse section of parts shown in the first two figures.

Figure 4 shows part of a tire and rim in perspective; and a part of my invention in connection therewith; and, Figure 5 is a transverse section of a rim, tire and part of the invention.

My invention has particular reference to wheel-rims of the quick detachable form wherein after removing certain parts of the rim a straight tire portion is exposed from which the tire is to be removed by pushing it therefrom.

Although it would seem to be an easy operation to thus remove a tire, as a matter of fact even after a new tire has been placed upon a new rim it is difficult to remove by reason of the considerable friction between these snugly fitting portions. But when the tire has long been on the rim and a slight corrosion or rusting of the latter has taken place the labor of removal is of no little moment. And it is by reason of this fact that I have designed an apparatus to make the removal comparatively easy, and very quick.

In the drawing, 1 is the wheel-rim, 1' the flange thereof, and 2 the tire mounted on said rim. The rim is first mounted upon a support either by placing the wheel carrying it upon a suitable standard, or by placing the rim, when removed from said wheel, upon a suitable clamp, the last named method being illustrated herein as an example. That is to say, 3 is a standard and 4 represents a series of shoes each being carried by one or more thread-bars 5, each of which at one end is threaded into a socket 6 of a head 7 as part of the standard 3, its other end engaging one of the shoes in any such manner that upon turning the said bars the shoes will be moved against the rim 1 to clamp it firmly. In the present instance, merely as an illustration, the thread-bars have ball ends 8 to engage the shoes, being held by an inside socket plate 9, it being understood that I may use any other form of structure by which the rim may be supported firmly.

Extending from the head 7 is an upstanding portion 10 to receive a hook 11 of a threaded rod 12. Opposite said rod 12 is a second threaded rod 13, the two being connected by a threaded sleeve 14 acting as a turn-buckle by which the rods may be drawn toward one another, or separated, as desired. The free end of the rod 13 carries a clip composed of two companion members 15 clamped thereto, said members receiving between them, slidably, a rod 16 having a suitable handle 17 at one end and an arm 18 at the other. The handle is preferably of a T-form as shown while the said arm 18 is preferably flat as in Figure 4.

The member 10 is centrally located with respect to the rim and to use the device the hook 11 is engaged therewith as shown whereupon the turn-buckle may be operated to draw the clip 15 up in close proximity to the rim, Figures 4 and 5, and at the same time, or previous to such adjustment, as may be found desirable to the user, the arm 18 is inserted between the tire 2 and flange 1' of the rim 1 as shown in several of the figures.

Now, by rocking the rod 16 by means of its handle 17, the heel of the arm bearing against the flange 1' as a fulcrum, the tire may be moved laterally upon said rim by forcing the arm upon it, the handle providing great leverage for the purpose. After each rocking movement of the rod and its arm for the above purpose the whole structure is swung about the member 10 in a step-by-step manner applying pressure at each new position around the rim until the tire has been forced off of the rim.

In Figure 1 the rods 12 and 13 have not been taken up to confine the arm 18 beneath the flange 1' but in the other figures the operative positions are made clear. The adjustability of the said rods admits of adapting the device to a rim of any diameter.

Changes may be made throughout the device without departing from the intent of the invention.

In inserting the arm or shoe 18 between the rim and the tire, if desired, the engagement or contact of the arm with the rim may be used as a fulcrum for swinging the member 16 downwardly around the pivotal connection of the clip 15 with the rod 13, thus gaining great power and leverage for forcing the part 18 fully between the rim and the tire, whereupon turning of the member 18, as it is moved around the rim, loosens or separates the parts facilitating the demounting of the tire.

I claim:

1. In an appliance of the character described, the combination of the arm having means at its inner end constructed to permit the arm to be mounted radially of a vehicle wheel rim and to be swung around the axis of the latter in a plane parallel to the rim, a support carried by said arm, a shaft rockably mounted in said support and adapted to turn about its own axis, a handle for said shaft to effect its oscillation, and a substantially-flat elongated shoe mounted on the inner end of said shaft with its longest dimension crosswise the shaft and adapted to be inserted between the rim and the tire thereon and to free the tire from the rim by its oscillatory movement during its travel around the rim.

2. In an appliance of the character described, the combination of an expansible and contractable arm having a single loop at its inner end constructed to permit the arm to be mounted radially of a vehicle wheel rim and to be swung around the axis of the latter in a plane parallel to that of the rim, a support hinged on said arm outwardly beyond the rim, a shaft rockably mounted in said support and adapted to turn about its own axis, a handle at the outer end of said shaft to effect its oscillation, and a substantially-flat elongated shoe rigidly mounted on the inner end of said shaft with its longest dimension crosswise the shaft and adapted to be inserted between the rim and the tire thereon, and to free the tire from the rim by its oscillatory movement during its progressive travel around the rim.

In testimony whereof I affix my signature.

JOSEPH B. SMITH.